United States Patent [19]
Ogata

[11] Patent Number: 4,789,226
[45] Date of Patent: Dec. 6, 1988

[54] ZOOM LENS SYSTEM
[75] Inventor: Yasuji Ogata, Tokyo, Japan
[73] Assignee: Olympus Optical Co., Ltd., Tokyo, Japan
[21] Appl. No.: 632,216
[22] Filed: Jul. 18, 1984
[30] Foreign Application Priority Data Jul. 22, 1983 [JP] Japan ................................. 58-132730

[51] Int. Cl.⁴ .............................................. G02B 15/16
[52] U.S. Cl. .................................................. 350/427
[58] Field of Search ................................ 350/423, 427

[56] References Cited
U.S. PATENT DOCUMENTS

| 4,094,586 | 6/1978 | Sato et al. | 350/427 |
|---|---|---|---|
| 4,359,270 | 11/1982 | Okudaira | 350/427 |
| 4,372,654 | 2/1983 | Fujioka et al. | 350/427 |
| 4,420,226 | 12/1983 | Kitagishi | 350/427 |
| 4,439,017 | 3/1984 | Yamaguchi | 350/427 |
| 4,456,341 | 6/1984 | Kato | 350/427 |
| 4,494,828 | 1/1985 | Masumoto et al. | 350/427 |
| 4,523,814 | 6/1985 | Okudaira | 350/427 |

FOREIGN PATENT DOCUMENTS 43-9276 4/1968 Japan .
57-161824 10/1982 Japan .
57-161804 10/1982 Japan .

Primary Examiner—John K. Corbin
Assistant Examiner—Scott J. Sugarman
Attorney, Agent, or Firm—Cushman, Darby & Cushman

[57] ABSTRACT

A zoom lens system comprising a first lens group having positive refractive power, a second lens group having negative refractive power, a third lens group having positive refractive power, and a fourth lens group having positive refractive power wherein the fourth lens group comprises a positive, positive and negative lens components, the zoom lens system having a large zoom ratio and large aperture ratio, i.e., F/5.0, and being compact in size and low in price.

9 Claims, 5 Drawing Sheets

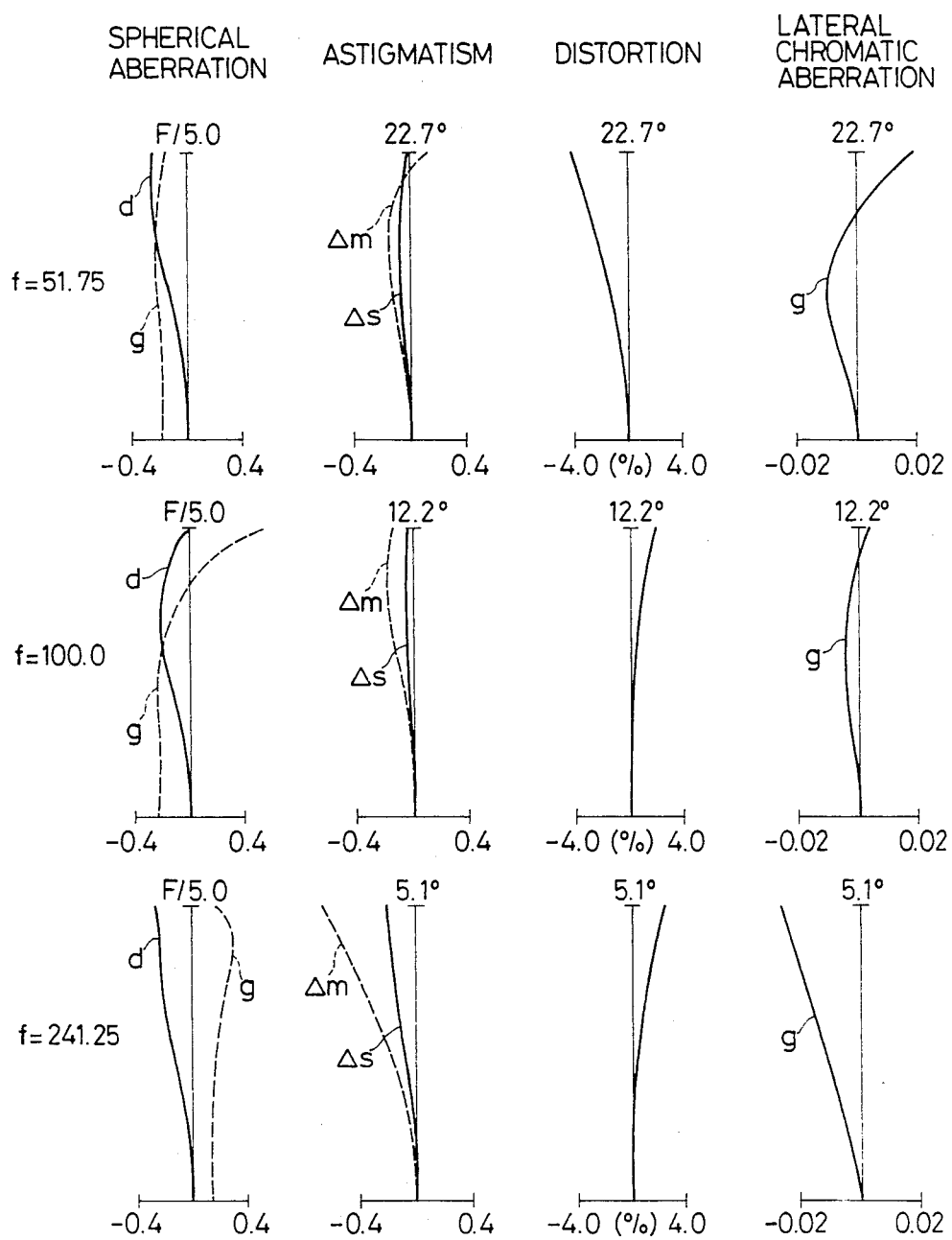

ZOOM LENS SYSTEM

BACKGROUND OF THE INVENTION

1. Field of the Invention

The present invention relates to a zoom lens system and, more particularly, to a compact and low-price zoom lens system with favourable performance and high vari-focal ratio.

2. Description of the Prior Art

In recent years, zoom lens systems are becoming very popular and, as a result, there is a large demand for compact and low-price zoom lens systems. Zoom lens systems disclosed in Japanese published unexamined patent applications Nos. 161824/82 and 161804/82 are known as examples of zoom lens systems provided in order to fulfill the above-mentioned demand. In case of said zoom lens systems, the zoom ratio is large. However, the aperture ratio is small, i.e., F/5.6 in the teleposition, the overall length is long and, moreover, the number of lenses constituting the lens system is large, i.e., eleven lens components with fourteen lens elements.

In case of a zoom lens system disclosed in Japanese published examined patent application No. 9276/68, the lens system has nine-component eleven-element lens configuration. However, the fourth lens group thereof is arranged as a triplet type lens group and, therefore, the lens system cannot be made compact enough.

SUMMARY OF THE INVENTION

It is, therefore, a primary object of the present invention to provide a zoom lens system comprising four lens groups in which the fourth lens group is arranged to comprise three lens components, i.e., a positive, positive and negative lens components, and which is thereby arranged to have a large zoom ratio with the focal length variable from 50 mm through 250 mm, large aperture ratio, i.e., F/5.0, and ten-component thirteen-element lens configuration, the zoom lens system being thereby arranged to be compact in size and low in cost and to have favourable performance.

The zoom lens system according to the present invention comprises a first lens group $G_1$ having positive refractive power, a second lens group $G_2$ having negative refractive power, a third lens group $G_3$ having positive refractive power and a fourth lens group $G_4$ having positive refractive power in the order from the object side, as shown in FIG. 1 or FIG. 2, and the fourth lens gorup $G_4$ is arranged to comprise three lens components, i.e., a positive, positive and negative lens components.

In case that the fourth lens group $G_4$ is arranged to have the triplet type lens configuration like the aforementioned known zoom lens system according to Japanese published examined patent application No. 9276/68, when arranging the fourth lens group $G_4$ to comprise three lens components as described in the above, it is impossible to make the telephoto ratio small because a triplet type lens system is basically symmetrical in shape and, therefore, the principal point thereof comes to a position in the inside of the lens system.

In case of the zoom lens system according to the present invention, the fourth lens group $G_4$ is arranged to comprise a positive, positive and negative lens components as described in the above, and the principal point of the fourth lens group $G_4$ is thereby shifted to a position outside and on the object side of the fourth lens groups $G_4$. Thus, it is possible to make the telephoto ratio smaller than that of the known zoom lens system in which the fourth lens group has the triplet type lens configuration and, consequently, it is possible to make the overall length of the zoom lens system short. Especially, when the power distribution to respective lens components in the fourth lens group $G_4$ is arranged as the telephoto type power distribution and the distance between the positive lens component on the object side and negative lens component is made long, it is possible to make the overall length of the lens system short even when the power of the negative lens component is made weak. Moreover, when the power of the negative lens component is made weak in case of telephoto type power distribution, it becomes easier to correct aberrations, and this is preferable.

By arranging the fourth lens group $G_4$ to have the above-mentioned lens configuration, it is possible to obtain a compact zoom lens system with well corrected aberrations. However, when the fourth lens group $G_4$ is arranged to comprise a positive meniscus lens which is convex toward to object side, a biconvex lens which is largely spaced from the above-mentioned positive meniscus lens, and a negative meniscus lens which is convex toward the image side in the order from the object side as illustrated by the embodiments shown in FIGS. 1 and 2, it is possible to correct aberrations more favourably.

By adopting the above-mentioned lens configuration, it is possible to obtain a zoom lens system with a short overall length. On the other hand, in case of a zoom lens system comprising four lens groups in which the first and fourth lens groups are not moved at the time of zooming, i.e., in case of a zoom lens system comprising four lens groups of which the overall length does not vary at the time of zooming, it is known that the overall length of the lens system can be made short when the refractive power of the second lens group having negative refractive power is made strong. However, when the power of the second lens group is made strong, aberrations become unfavourable. Therefore, to keep aberrations favourably at all focal lengths, the number of lenses constituting the lens system should be increased, and this is contrary to an object of the present invention to provide a zoom lens system with a low cost. The above-mentioned disadvantage becomes more significant when the zoom ratio is made larger.

When the overall length of the zoom lens system is varied at the time of zooming as in cases of embodiments shown later and the vari-focal function of the second lens group is thereby alloted to respective lens groups, it is possible to prevent aberrations of a particular lens group from becoming large. In that case, by distributing the powers adequately to respective lens groups, it is possible to arrange that aberrations of a particular lens group do not become large. For moving the lens groups in that case, various moving methods may be considered, i.e., a method to move all lens groups individually, a method to integrally move some lens groups out of the four lens groups, a method to keep some of lens groups, except the first lens group, fixed and to move all of the other lens groups individually, and so forth.

The zoom lens system according to the present invention is composed as described so far. To obtain a zoom lens system of which aberrations are corrected more favourably and variation in aberrations is small, it is preferable to compose the first, second and third lens groups as described below. That is, it is preferable to arrange that the first lens group comprises a positive cemented doublet and a positive lens component, the second lens group comprises a negative lens component, a negative lens component and a positive cemented doublet, and the third lens group comprises a positive lens component and positive cemented doublet. Besides, it is preferable to arrange that the zoom lens system fulfills the conditions (1) through (7) shown below where reference symbol $f_T$ represents the focal length of the lens system as a whole in the teleposition, reference symbols $f_2$ and $f_4$ respectively represent the focal lengths of the second lens group $G_2$ and the fourth lens group $G_4$, reference symbol $d_9$ represents the airspace between the negative lens component on the image side in the second lens group $G_2$ and positive cemented doublet in the second lens group $G_2$, reference symbol $r_{11}$ represents the radius of curvature of the cemented surface of the positive cemented doublet in the second lens group $G_2$, reference symbol $r_{22}$ represents the radius of curvature of the surface on the object side of the negative meniscus lens in the fourth lens group $G_4$, reference symbols $n_9$ and $n_{10}$ respectively represent refractive indices of respective lens elements constituting the positive cemented doublet in the third lens group $G_3$, and reference symbol $\nu_{11}$ represents Abbe's number of the positive lens component on the object side in the fourth lens group.

$$0.10 < \left|\frac{f_2}{f_T}\right| < 0.14 \quad (1)$$

$$0.54 < \left|\frac{f_4}{f_T}\right| < 0.82 \quad (2)$$

$$1.0 < d_9 < 3.0 \quad (3)$$

$$20 < |r_{22}| < 30 \quad (4)$$

$$\nu_{11} > 60 \quad (5)$$

$$40 < |r_{11}| < 65 \quad (6)$$

$$0.19 < |n_9 - n_{10}| < 0.27 \quad (7)$$

Now, detailed explanation of the above-mentioned conditions is shown below.

The conditions (1) and (2) respectively define the powers of the second lens group $G_2$ and the fourth lens group $G_4$. Due to the reason described already, it is important to distribute the powers to respective lens groups adequately.

If $|f_2/f_T|$ becomes smaller than the lower limit of the condition (1) and the power of the second lens group $G_4$ becomes too strong, Petzval's sum of the lens system as a whole becomes a negative value with a large absolute value and characteristic of image surface becomes unfavourable. Moreover, spherical aberration and coma become unfavourable, variation in aberrations at the time of zooming becomes large, and it is difficult to correct them. If it is tried to correct them by increasing the number of lenses constituting the second lens group, the lens system becomes large in size, the cost becomes high, and these are contrary to the object of the present invention. When $|f_2/f_T|$ becomes larger than the upper limit of the condition (1) and the power of the second lens group becomes weak, it is advantageous for correction of aberrations. However, the diameter of the front lens component becomes large, and it is impossible to make the lens system small in size.

If $|f_4/f_T|$ becomes smaller than the lower limit of the condition (2) and the power of the fourth lens group $G_4$ becomes too strong, the principal point of the fourth lens group $G_4$ comes to a position at a large distance from the fourth lens group when a necessary airspace is provided between the third lens group $G_3$ and the fourth lens group $G_4$ so that said lens groups will not interfere with each other. As a result, the telephoto ratio of the fourth lens group $G_4$ becomes too small, and it is impossible to correct aberrations satisfactorily favourably on condition that the fourth lens group $G_4$ comprises three lens components. Besides, the imaging magnification of the fourth lens group $G_4$ becomes large in the teleposition, variation in aberrations at the time of zooming becomes large, and it is impossible to correct aberrations favourably. When $|f_4/f_T|$ becomes larger than the upper limit of the condition (2) and the power of the fourth lens group $G_4$ becomes weak, it is advantageous for correction of aberrations. However, the beck focal length becomes long, and the overall length of the lens system becomes long.

If $d_9$ becomes smaller than the lower limit of the condition (3), spherical aberration and curvature of field will be overcorrected, and it is difficult to correct them. If $d_9$ becomes larger than the upper limit of the condition (3), aberrations will be undercorrected. Moreover, the second lens group $G_2$ becomes long, the overall length of the lens system becomes long, the diameter of the front lens component becomes large, and it is impossible to attain an object of the present invention to make the zoom lens system small in size.

If $|r_{22}|$ becomes smaller than the lower limit of the condition (4), spherical aberration and curvature of field will be undercorrected, and variation in distortion becomes large on the short focal length side and long focal length side. If $|r_{22}|$ becomes larger than the upper limit of the condition (4), spherical aberration and curvature of field will be overcorrected.

As one of weak points of zoom lens systems, it is known that the quality of image decreases because of variation in chromatic aberration. Especially, telephototype zoom lens systems are susceptible to the influence of longitudinal chromatic aberration, lateral chromatic aberration, and spherical chromatic aberration.

The zoom lens system according to the present invention is arranged to fulfill the conditions (5), (6) and (7) in order to minimize chromatic aberration.

The condition (5) is established in order to especially eliminate the secondary spectrum on the long focal distance side and defines Abbe's number $\nu_{11}$ of the positive lens component on the object side in the fourth lens group. If $\nu_{11}$ becomes smaller than 60 defined by the condition (5), the residual secondary spectrum becomes large and the quality of image decreases.

The condition (6) is established in order to correct the variation in lateral chromatic aberration at the time of zooming in well balanced state. If $|r_{11}|$ becomes larger than the upper limit of the condition (6), lateral chromatic aberration for g-line will be undercorrected on the short focal length side and will be overcorrected on the long focal distance side, and it will be difficult to correct it. If $|r_{11}|$ becomes smaller than the lower limit of the condition (6), lateral chromatic aberration for g-line will be overcorrected on the short focal length side and undercorrected on the long focal length side conversely to the case that $|r_{11}|$ becomes larger than the upper limit thereof.

The condition (7) is established in order to correct spherical aberration for g-line on the long focal length side. Generally, for zoom lens systems, spherical aberration for g-line tends to be extremely overcorrected from the intermediate focal length to the long focal length side. This is not desirable because it causes flare and results in decrease in the quality of image. In the present invention, strong diverging action is given to the cemented surface of the cemented doublet in the third lens group $G_3$ so as to thereby correct spherical aberration. The diverging action of said cemented surface is strong, and said surface is liable to cause aberration of higher order. However, in the present invention, it is so arranged that chromatic aberration is corrected favourably by balancing chromatic aberration caused by said cemented surface with chromatic aberration caused by other surfaces.

If the value defined by the condition (7) becomes smaller than the lower limit thereof and the difference between refractive indices of lens elements on both sides of said cemented surface becomes small, spherical aberration for g-line will be considerably undercorrected even when spherical aberration for d-line is corrected by making the radius of curvature of said cemented surface small or corrected by means of other surfaces. If the value defined by the condition (7) becomes larger than the upper limit thereof, aberration of higher order will be caused more than needed, and it will be difficult to correct it. Moreover, spherical aberration for g-line will be undercorrected considerably.

BRIEF DESCRIPTION OF THE DRAWINGS

FIG. 3 through 5 respectively show graphs illustrating aberration curves of Embodiments 1 through 3 of the present invention.

DETAILED DESCRIPTION OF THE PREFERRED EMBODIMENTS

Figure 1:
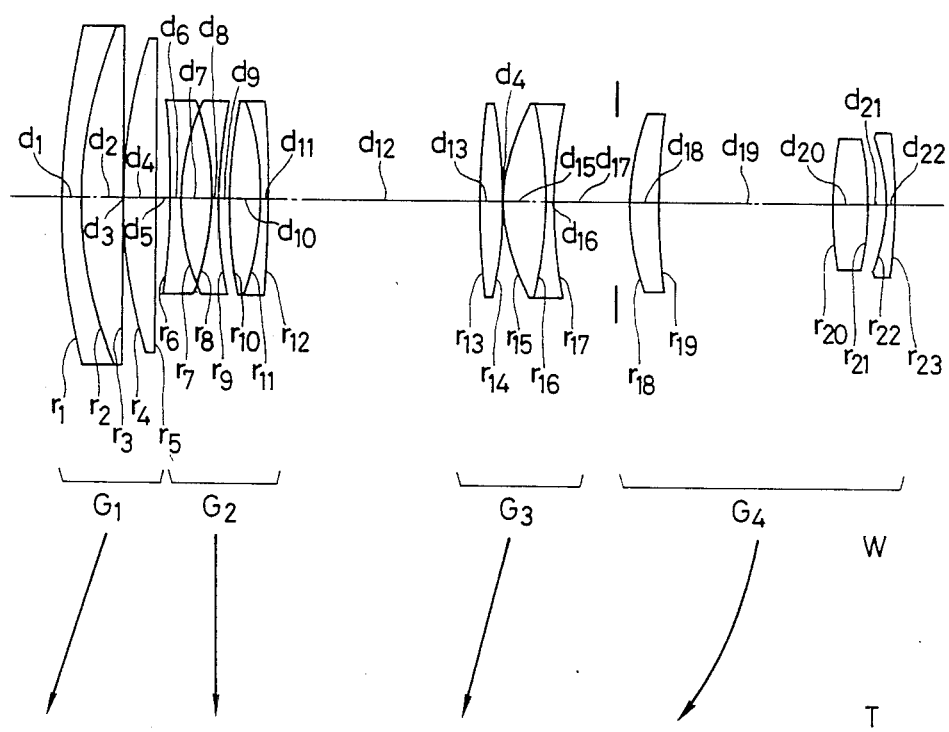
FIG. 1 shows a sectional view of Embodiments 1 and 2 of the zoom lens system according to the present invention.

Now, preferred embodiments of the zoom lens system according to the present invention described so far are shown below.

Embodiment 1

| \multicolumn{4}{c}{$f = 51.50 \sim 242.50$, F/5.0} |
|---|---|---|---|
| $r_1 = 128.727$ | | | |
| | $d_1 = 2.50$ | $n_1 = 1.84666$ | $\nu_1 = 23.88$ |
| $r_2 = 68.205$ | | | |
| | $d_2 = 7.50$ | $n_2 = 1.48749$ | $\nu_2 = 70.15$ |
| $r_3 = -299.373$ | | | |
| | $d_3 = 0.10$ | | |
| $r_4 = 69.486$ | | | |
| | $d_4 = 5.20$ | $n_3 = 1.52310$ | $\nu_3 = 50.84$ |
| $r_5 = \infty$ | | | |
| | $d_5 = D_1$ (variable) | | |
| $r_6 = -261.031$ | | | |
| | $d_6 = 1.50$ | $n_4 = 1.77250$ | $\nu_4 = 49.66$ |
| $r_7 = 39.500$ | | | |
| | $d_7 = 5.40$ | | |
| $r_8 = -53.505$ | | | |
| | $d_8 = 1.50$ | $n_5 = 1.77250$ | $\nu_5 = 49.66$ |
| $r_9 = 62.712$ | | | |
| | $d_9 = 2.33$ | | |
| $r_{10} = 61.045$ | | | |
| | $d_{10} = 5.50$ | $n_6 = 1.78472$ | $\nu_6 = 25.71$ |
| $r_{11} = -57.198$ | | | |
| | $d_{11} = 1.50$ | $n_7 = 1.77250$ | $\nu_7 = 49.66$ |
| $r_{12} = \infty$ | | | |
| | $d_{12} = D_2$ (variable) | | |
| $r_{13} = 165.028$ | | | |
| | $d_{13} = 3.80$ | $n_8 = 1.66892$ | $\nu_8 = 44.98$ |
| $r_{14} = -75.553$ | | | |
| | $d_{14} = 0.10$ | | |
| $r_{15} = 35.272$ | | | |
| | $d_{15} = 7.80$ | $n_9 = 1.48749$ | $\nu_9 = 70.15$ |
| $r_{16} = -62.293$ | | | |
| | $d_{16} = 1.50$ | $n_{10} = 1.74077$ | $\nu_{10} = 27.79$ |
| $r_{17} = 79.705$ | | | |
| | $d_{17} = D_3$ (variable) | | |
| $r_{18} = 34.235$ | | | |
| | $d_{18} = 4.88$ | $n_{11} = 1.48749$ | $\nu_{11} = 70.15$ |
| $r_{19} = 97.153$ | | | |
| | $d_{19} = 28.30$ | | |
| $r_{20} = 86.089$ | | | |
| | $d_{20} = 5.39$ | $n_{12} = 1.54072$ | $\nu_{12} = 47.20$ |
| $r_{21} = -81.160$ | | | |
| | $d_{21} = 3.00$ | | |
| $r_{22} = -24.571$ | | | |
| | $d_{22} = 1.50$ | $n_{13} = 1.77250$ | $\nu_{13} = 49.66$ |
| $r_{23} = -70.469$ | | | |

| | f | $D_1$ | $D_2$ | $D_3$ |
|---|---|---|---|---|
| wide position | 51.50 | 2.073 | 36.245 | 14.985 |
| standard position | 100.00 | 17.720 | 20.598 | 8.210 |
| teleposition | 242.50 | 37.918 | 0.400 | 6.996 | overall length of the lens system = 181.60 (W)~218.20 (T)
$|f_2/f_T| = 0.11$, $f_4/f_T = 0.68$

Embodiment 2

| \multicolumn{4}{c}{$f = 51.50 \sim 242.50$, F/5.0} |
|---|---|---|---|
| $r_1 = 128.395$ | | | |
| | $d_1 = 2.50$ | $n_1 = 1.84666$ | $\nu_1 = 23.88$ |
| $r_2 = 68.149$ | | | |
| | $d_2 = 7.50$ | $n_2 = 1.48749$ | $\nu_2 = 70.15$ |
| $r_3 = -478.561$ | | | |
| | $d_3 = 0.10$ | | |
| $r_4 = 61.404$ | | | |
| | $d_4 = 6.00$ | $n_3 = 1.51742$ | $\nu_3 = 52.41$ |
| $r_5 = 1197.293$ | | | |
| | $d_5 = D_1$ (variable) | | |
| $r_6 = -2114.022$ | | | |
| | $d_6 = 1.50$ | $n_4 = 1.77250$ | $\nu_4 = 49.66$ |
| $r_7 = 35.576$ | | | |
| | $d_7 = 5.40$ | | |
| $r_8 = -51.140$ | | | |
| | $d_8 = 1.50$ | $n_5 = 1.77250$ | $\nu_5 = 49.66$ |
| $r_9 = 59.878$ | | | |
| | $d_9 = 2.04$ | | |
| $r_{10} = 60.660$ | | | |
| | $d_{10} = 5.50$ | $n_6 = 1.78472$ | $\nu_6 = 25.71$ |
| $r_{11} = -57.198$ | | | |
| | $d_{11} = 1.50$ | $n_7 = 1.77240$ | $\nu_7 = 49.66$ |
| $r_{12} = -713.043$ | | | |
| | $d_{12} = D_2$ (variable) | | |
| $r_{13} = 147.275$ | | | |
| | $d_{13} = 3.80$ | $n_8 = 1.64328$ | $\nu_8 = 47.85$ |
| $r_{14} = -85.306$ | | | |
| | $d_{14} = 0.10$ | | |
| $r_{15} = 37.347$ | | | |
| | $d_{15} = 7.40$ | $n_9 = 1.48749$ | $\nu_9 = 70.15$ |
| $r_{16} = -62.692$ | | | |
| | $d_{16} = 1.50$ | $n_{10} = 1.72825$ | $\nu_{10} = 28.46$ |
| $r_{17} = 89.560$ | | | |
| | $d_{17} = D_3$ (variable) | | |
| $r_{18} = 32.932$ | | | |
| | $d_{18} = 5.27$ | $n_{11} = 1.48749$ | $\nu_{11} = 70.15$ |
| $r_{19} = 95.696$ | | | |
| | $d_{19} = 26.39$ | | |
| $r_{20} = 60.343$ | | | |

-continued

| | | | |
|---|---|---|---|
| | $d_{20} = 6.97$ | $n_{12} = 1.54072$ | $\nu_{12} = 47.20$ |
| $r_{21} = -126.559$ | | | |
| | $d_{21} = 3.62$ | | |
| $r_{22} = -24.279$ | | | |
| | $d_{22} = 1.50$ | $n_{13} = 1.80400$ | $\nu_{13} = 46.57$ |
| $r_{23} = -72.053$ | | | |

| | f | $D_1$ | $D_2$ | $D_3$ |
|---|---|---|---|---|
| wide position | 51.50 | 1.180 | 36.211 | 15.241 |
| standard position | 100.00 | 16.827 | 20.564 | 8.867 |
| teleposition | 242.50 | 37.025 | 0.366 | 4.523 | overall length of the lens system = 181.71 (W)~215.18 (T)
$|f_2/f_T| = 0.12$, $f_4/f_T = 0.61$ Embodiment 3

$f = 51.75 \sim 241.25$, F/5.0

| | | | |
|---|---|---|---|
| $r_1 = 111.361$ | | | |
| | $d_1 = 2.80$ | $n_1 = 1.84666$ | $\nu_1 = 23.88$ |
| $r_2 = 67.753$ | | | |
| | $d_2 = 7.00$ | $n_2 = 1.48749$ | $\nu_2 = 70.15$ |
| $r_3 = \infty$ | | | |
| | $d_3 = 0.10$ | | |
| $r_4 = 88.370$ | | | |
| | $d_4 = 5.70$ | $n_3 = 1.51742$ | $\nu_3 = 52.41$ |
| $r_5 = -1294.543$ | | | |
| | $d_5 = D_1$ (variable) | | |
| $r_6 = -178.326$ | | | |
| | $d_6 = 1.50$ | $n_4 = 1.77250$ | $\nu_4 = 49.66$ |
| $r_7 = 36.631$ | | | |
| | $d_7 = 5.00$ | | |
| $r_8 = -53.997$ | | | |
| | $d_8 = 1.51$ | $n_5 = 1.78590$ | $\nu_5 = 44.18$ |
| $r_9 = 78.310$ | | | |
| | $d_9 = 1.84$ | | |
| $r_{10} = 66.355$ | | | |
| | $d_{10} = 5.40$ | $n_6 = 1.78470$ | $\nu_6 = 26.22$ |
| $r_{11} = -51.596$ | | | |
| | $d_{11} = 1.60$ | $n_7 = 1.77250$ | $\nu_7 = 49.66$ |
| $r_{12} = -202.724$ | | | |
| | $d_{12} = D_2$ (variable) | | |
| $r_{13} = 146.837$ | | | |
| | $d_{13} = 3.80$ | $n_8 = 1.67003$ | $\nu_8 = 47.25$ |
| $r_{14} = -80.269$ | | | |
| | $d_{14} = 0.10$ | | |
| $r_{15} = 34.080$ | | | |
| | $d_{15} = 7.60$ | $n_9 = 1.48749$ | $\nu_9 = 70.15$ |
| $r_{16} = -60.335$ | | | |
| | $d_{16} = 1.70$ | $n_{10} = 1.71737$ | $\nu_{10} = 29.51$ |
| $r_{17} = 70.612$ | | | |
| | $d_{17} = D_3$ (variable) | | |
| $r_{18} = 37.699$ | | | |
| | $d_{18} = 5.0$ | $n_{11} = 1.48749$ | $\nu_{11} = 70.15$ |
| $r_{19} = 107.922$ | | | |
| | $d_{19} = 28.76$ | | |
| $r_{20} = 72.285$ | | | |
| | $d_{20} = 5.00$ | $n_{12} = 1.53172$ | $\nu_{12} = 48.90$ |
| $r_{21} = -63.118$ | | | |
| | $d_{21} = 3.00$ | | |
| $r_{22} = -26.315$ | | | |
| | $d_{22} = 1.50$ | $n_{13} = 1.77250$ | $\nu_{13} = 49.66$ |
| $r_{23} = -112.160$ | | | |

| | f | $D_1$ | $D_2$ | $D_3$ |
|---|---|---|---|---|
| wide position | 51.75 | 2.733 | 35.896 | 13.443 |
| standard position | 100.00 | 24.335 | 20.406 | 7.299 |
| teleposition | 241.25 | 50.233 | 0.535 | 5.002 | overall length of the lens system = 180.64 (W)~225.64 (T)
$|f_2/f_T| = 0.13$, $f_4/f_T = 0.71$ In embodiments shown in the above, reference symbols $r_1$ through $r_{23}$ respectively represent radii of curvature of respective lenses, reference symbols $d_1$ through $d_{22}$ respectively represent thicknesses of respective lenses and airspaces between respective lenses, reference symbols $n_1$ through $n_{13}$ respectively represent refractive indices of respective lenses, and reference symbols $\nu_1$ through $\nu_{13}$ respectively represent Abbe's numbers of respective lenses.

Variations in airspaces at the time of zooming of respective embodiments shown in the above are a shown in the numerical data thereof. In all embodiments, the stop is provided at the position of 2.00 from and in front of the eighteenth surface ($r_{18}$).

Figure 2:
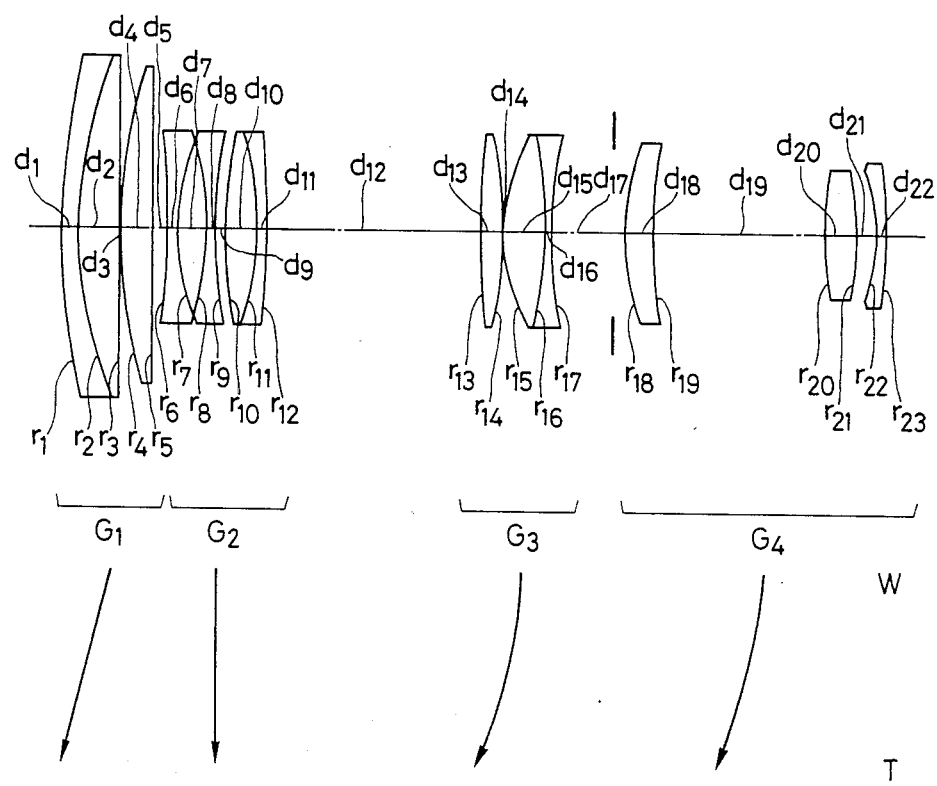
FIG. 2 shows a sectional view of Embodiment 3 of the zoom lens system according to the present invention.
Figure 3:
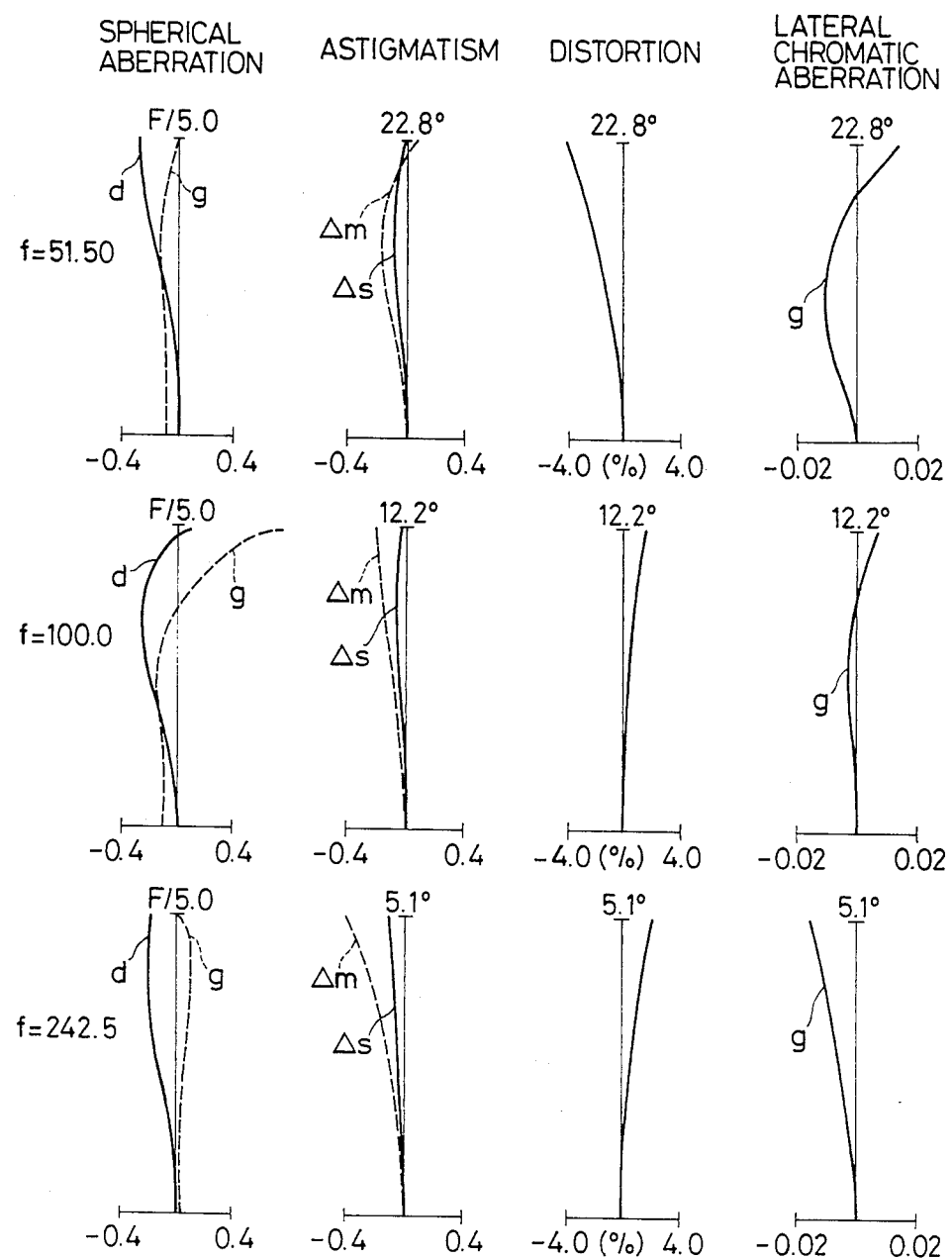
Figure 4:
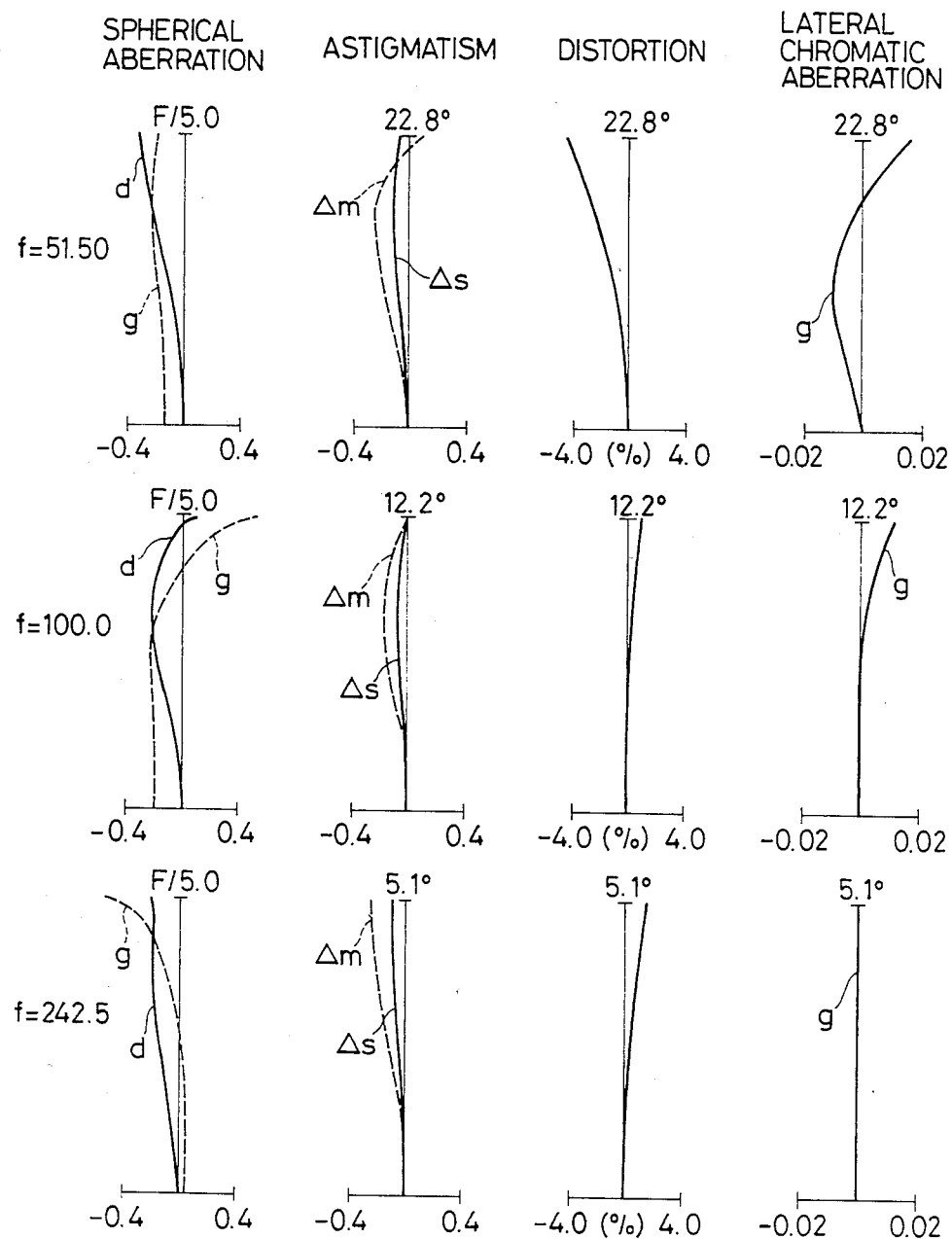

All of embodiments shown in the above respectively comprise four lens groups, and the fourth lens group $G_4$ thereof comprises three lens components, i.e., a positive, positive and negative lens components. Said embodiments respectively provide high vari-focal ratio zoom lens systems of which the zoom ratio from the field angle in the standard position to the field angle in the teleposition is close to 5. If the zooming method by which the overall length of the lens system is not varied is adopted for said zoom lens systems, the power of the second lens group should be made strong when it is attempted to make the lens system compact. To prevent aberration from becoming unfavourable at that time, the number of lens elements constituting the lens system should be increased, and this is not preferable for making the cost low. Therefore, the zooming method by which the overall length of the lens system is varied is adopted in respective embodiments shown in the above. That is, Embodiments 1 and 2 respectively have the lens configuration as shown in FIG. 1 and are zoomed by moving respective lens groups as shown by arrow marks in FIG. 1. Embodiment 3 has the lens configuration as shown in FIG. 2 and is zoomed by moving respective lens groups as shown by arrow marks in FIG. 2.

As described so far, the zoom lens system provided by the present invention has a high vari-focal ratio, i.e., the zoom ratio close to 5, and at the same time it is arranged to be compact in size with a short overall length and low in cost with the ten-component thirteen-element lens configuration and to have high performance.

I claim:

1. A zoom lens system comprising, in the order from the object side, a first lens group having a positive refractive power and comprising a positive cemented doublet, a second lens group having negative refractive power and comprising two negative lens components and a positive lens component, a third lens group having positive refractive power and comprising a cemented doublet, and a fourth lens group having a positive refractive power, and said fourth lens group, which is arranged to be the rearmost lens group, consisting of a positive lens element, a positive lens element and a negative lens element, the airspaces between said lens elements constituting the fourth lens group being constant, and the airspace between said third lens group and fourth lens group being variable at the time of zooming.

2. A zoom lens system according to claim 1 wherein said fourth lens group consists of a positive meniscus lens convex toward the object side, a biconvex lens spaced a distance from said positive meniscus lens, and a negative meniscus lens convex toward the image side.

3. A zoom lens system according to claim 1 wherein said first lens group further comprises a positive lens component, said second lens group comprises a negative lens component, a negative lens component and a positive cemented doublet, and said third lens group comprises a positive lens component and a positive cemented doublet.

4. A zoom lens system according to claim 2 wherein said first lens group further comprises a positive lens component, said second lens group comprises a negative lens component, a negative lens component and a positive cemented doublet, and said third lens group comprises a positive lens component and a positive cemented doublet.

5. A zoom lens system comprising, in order from the object side, a first lens group having positive refractive power, a second lens group having negative refractive power, a third lens group having positive refractive power, and a fourth lens group having positive refractive power, said fourth lens group comprising a positive lens element, a positive lens element and a negative lens element in the order from the object side, said first lens group comprising a positive cemented doublet and a positive lens component, said second lens group comprising a negative lens component, a negative lens component and a positive cemented doublet and said third lens group comprising a positive lens component and a positive cemented doublet, said system fulfilling the conditions (1) through (4) shown below:

$$0.10 < \left|\frac{f_2}{f_T}\right| < 0.14 \quad (1)$$

$$0.54 < \left|\frac{f_4}{f_T}\right| < 0.82 \quad (2)$$

$$1.0 < d_9 < 3.0 \quad (3)$$

$$20 < |r_{22}| < 30 \quad (4)$$

where, reference symbol $f_T$ represents the focal lengths of the lens system as a whole in the teleposition, references symbols $f_2$ and $f_4$ respectively represent the focal lengths of the second lens group and the fourth lens group, reference symbol $d_9$ represents the airspace between the negative lens component and the image side and positive cemented doublet in the second lens group, reference symbol $r_{22}$ represents the radius of curvature of the surface on the object side of the negative lens component in the fourth lens group.

6. A zoom lens system according to claim 5 which fulfills the condition (5) through (7) shown below:

$$\nu_{11} > 60 \quad (5)$$

$$40 < |r_{11}| < 65 \quad (6)$$

$$0.19 < |n_9 - n_{10}| < 0.27 \quad (7)$$

where, reference symbol $r_{11}$ represents the radius of curvature of the cemented surface of the positive cemented doublet in the second lens group, reference symbols $n_9$ and $n_{10}$ respectively represent refractive indices of respective lens elements constituting the positive cemented doublet in the third lens group, and reference symbol $\nu_{11}$ represents Abbe's number of the positive lens component on the object side in the fourth lens group.

7. A zoom lens system according to claim 6 which has the following numerical data:

| f = 51.50~242.50, F/5.0 | | | |
|---|---|---|---|
| $r_1 = 128.727$ | | | |
| | $d_1 = 2.50$ | $n_1 = 1.84666$ | $\nu_1 = 23.88$ |
| $r_2 = 68.205$ | | | |
| | $d_2 = 7.50$ | $n_2 = 1.48749$ | $\nu_2 = 70.15$ |
| $r_3 = -299.373$ | | | |
| | $d_3 = 0.10$ | | |
| $r_4 = 69.486$ | | | |
| | $d_4 = 5.20$ | $n_3 = 1.52310$ | $\nu_3 = 50.84$ |
| $r_5 = \infty$ | | | |
| | $d_5 = D_1$ (variable) | | |
| $r_6 = -261.031$ | | | |
| | $d_6 = 1.50$ | $n_4 = 1.77250$ | $\nu_4 = 49.66$ |
| $r_7 = 39.500$ | | | |
| | $d_7 = 5.40$ | | |
| $r_8 = -53.505$ | | | |
| | $d_8 = 1.50$ | $n_5 = 1.77250$ | $\nu_5 = 49.66$ |
| $r_9 = 62.712$ | | | |
| | $d_9 = 2.33$ | | |
| $r_{10} = 61.045$ | | | |
| | $d_{10} = 5.50$ | $n_6 = 1.78472$ | $\nu_6 = 25.71$ |
| $r_{11} = -57.198$ | | | |
| | $d_{11} = 1.51$ | $n_7 = 1.77250$ | $\nu_7 = 49.66$ |
| $r_{12} = \infty$ | | | |
| | $d_{12} = D_2$ (variable) | | |
| $r_{13} = 165.028$ | | | |
| | $d_{13} = 3.80$ | $n_8 = 1.66892$ | $\nu_8 = 44.98$ |
| $r_{14} = -75.553$ | | | |
| | $d_{14} = 0.10$ | | |
| $r_{15} = 35.272$ | | | |
| | $d_{15} = 7.80$ | $n_9 = 1.48749$ | $\nu_9 = 70.15$ |
| $r_{16} = -62.293$ | | | |
| | $d_{16} = 1.50$ | $n_{10} = 1.74077$ | $\nu_{10} = 27.79$ |
| $r_{17} = 79.705$ | | | |
| | $d_{17} = D_3$ (variable) | | |
| $r_{18} = 34.235$ | | | |
| | $d_{18} = 4.88$ | $n_{11} = 1.48749$ | $\nu_{11} = 70.15$ |
| $r_{19} = 97.153$ | | | |
| | $d_{19} = 28.30$ | | |
| $r_{20} = 86.089$ | | | |
| | $d_{20} = 5.39$ | $n_{12} = 1.54072$ | $\nu_{12} = 47.20$ |
| $r_{21} = -81.160$ | | | |
| | $d_{21} = 3.00$ | | |
| $r_{22} = -24.571$ | | | |
| | $d_{22} = 1.50$ | $n_{13} = 1.77250$ | $\nu_{13} = 49.66$ |
| $r_{23} = -70.469$ | | | |

| | f | $D_1$ | $D_2$ | $D_3$ |
|---|---|---|---|---|
| wide position | 51.50 | 2.073 | 36.245 | 14.985 |
| standard position | 100.00 | 17.720 | 20.598 | 8.210 |
| teleposition | 242.50 | 37.918 | 0.400 | 6.996 | overall length of the lens system = 181.60 (W)~218.20 (T)
$|f_2/f_T| = 0.11$, $f_4/f_T = 0.68$ where, reference symbols $r_1$ through $r_{23}$ respectively represent radii of curvature of respective lenses, reference symbols $d_1$ through $d_{22}$ respectively represent thicknesses of respective lenses and airspaces between respective lenses, reference symbols $n_1$ through $n_{13}$ respectively represent refractive indices of respective lenses, and reference symbols $\nu_1$ through $\nu_{13}$ respectively represent Abbe's numbers of respective lenses.

8. A zoom lens system according to claim 6 which has the following numerical data:

| f = 51.50~242.50, F/5.0 | | | |
|---|---|---|---|
| $r_1 = 128.395$ | | | |
| | $d_1 = 2.50$ | $n_1 = 1.84666$ | $\nu_1 = 23.88$ |
| $r_2 = 68.149$ | | | |
| | $d_2 = 7.50$ | $n_2 = 1.48749$ | $\nu_2 = 70.15$ |
| $r_3 = -478.561$ | | | |
| | $d_3 = 0.10$ | | |
| $r_4 = 61.404$ | | | |
| | $d_4 = 6.00$ | $n_3 = 1.51742$ | $\nu_3 = 52.41$ |
| $r_5 = 1197.293$ | | | |
| | $d_5 = D_1$ (variable) | | |
| $r_6 = -2114.022$ | | | |
| | $d_6 = 1.50$ | $n_4 = 1.77250$ | $\nu_4 = 49.66$ |
| $r_7 = 35.576$ | | | |
| | $d_7 = 5.40$ | | |

-continued

| | | | |
|---|---|---|---|
| $r_8 =$ | $-51.140$ | | |
| | $d_8 = 1.50$ | $n_5 = 1.77250$ | $\nu_5 = 49.66$ |
| $r_9 =$ | $59.878$ | | |
| | $d_9 = 2.04$ | | |
| $r_{10} =$ | $60.660$ | | |
| | $d_{10} = 5.50$ | $n_6 = 1.78472$ | $\nu_6 = 25.71$ |
| $r_{11} =$ | $-57.198$ | | |
| | $d_{11} = 1.50$ | $n_7 = 1.77250$ | $\nu_7 = 49.66$ |
| $r_{12} =$ | $-713.043$ | | |
| | $d_{12} = D_2$ (variable) | | |
| $r_{13} =$ | $147.275$ | | |
| | $d_{13} = 3.80$ | $n_8 = 1.64328$ | $\nu_8 = 47.85$ |
| $r_{14} =$ | $-85.306$ | | |
| | $d_{14} = 0.10$ | | |
| $r_{15} =$ | $37.347$ | | |
| | $d_{15} = 7.40$ | $n_9 = 1.48749$ | $\nu_9 = 70.15$ |
| $r_{16} =$ | $-62.692$ | | |
| | $d_{16} = 1.50$ | $n_{10} = 1.72825$ | $\nu_{10} = 28.46$ |
| $r_{17} =$ | $89.560$ | | |
| | $d_{17} = D_3$ (variable) | | |
| $r_{18} =$ | $32.932$ | | |
| | $d_{18} = 5.27$ | $n_{11} = 1.48749$ | $\nu_{11} = 70.15$ |
| $r_{19} =$ | $95.696$ | | |
| | $d_{19} = 26.39$ | | |
| $r_{20} =$ | $60.343$ | | |
| | $d_{20} = 6.79$ | $n_{12} = 1.54072$ | $\nu_{12} = 47.20$ |
| $r_{21} =$ | $-126.559$ | | |
| | $d_{21} = 3.62$ | | |
| $r_{22} =$ | $-24.279$ | | |
| | $d_{22} = 1.50$ | $n_{13} = 1.80400$ | $\nu_{13} = 46.57$ |
| $r_{23} =$ | $-72.053$ | | |

| | f | $D_1$ | $D_2$ | $D_3$ |
|---|---|---|---|---|
| wide position | 51.50 | 1.180 | 36.211 | 15.241 |
| standard position | 100.00 | 16.827 | 20.564 | 8.867 |
| teleposition | 242.50 | 37.025 | 0.366 | 4.523 | overall length of the lens system = 181.71 (W)~215.18 (T)
$|f_2/f_T| = 0.12$, $f_4/f_T = 0.61$ where, reference symbols $r_1$ through $r_{23}$ respectively represent radii of curvature of respective lenses, reference symbols $d_1$ through $d_{22}$ respectively represent thicknesses of respective lenses and airspaces between respective lenses, reference symbols $n_1$ through $n_{13}$ respectively represent refractive indices of respective lenses, and reference symbols $\nu_1$ through $\nu_{13}$ respectively represent Abbe's numbers of respective lenses.

9. A zoom lens system according to claim 6 which has the following numerical data:

| f = 51.75~241.25, F/5.0 | | | |
|---|---|---|---|
| $r_1 =$ | $111.361$ | | |
| | $d_1 = 2.80$ | $n_1 = 1.8666$ | $\nu_1 = 23.88$ |
| $r_2 =$ | $67.753$ | | |
| | $d_2 = 7.00$ | $n_2 = 1.48749$ | $\nu_2 = 70.15$ |
| $r_3 =$ | $\infty$ | | |
| | $d_3 = 0.10$ | | |
| $r_4 =$ | $88.370$ | | |
| | $d_4 = 5.70$ | $n_3 = 1.51742$ | $\nu_3 = 52.41$ |
| $r_5 =$ | $-1294.543$ | | |
| | $d_5 = D_1$ (variable) | | |
| $r_6 =$ | $-178.326$ | | |
| | $d_6 = 1.50$ | $n_4 = 1.77250$ | $\nu_4 = 49.66$ |
| $r_7 =$ | $36.631$ | | |
| | $d_7 = 5.00$ | | |
| $r_8 =$ | $-53.997$ | | |
| | $d_8 = 1.50$ | $n_5 = 1.78590$ | $\nu_5 = 44.18$ |
| $r_9 =$ | $78.310$ | | |
| | $d_9 = 1.84$ | | |
| $r_{10} =$ | $66.355$ | | |
| | $d_{11} = 5.40$ | $n_6 = 1.78470$ | $\nu_6 = 26.22$ |
| $r_{11} =$ | $-50.596$ | | |
| | $d_{11} = 1.60$ | $n_7 = 1.77250$ | $\nu_7 = 49.66$ |
| $r_{12} =$ | $-202.724$ | | |
| | $d_{12} = D_2$ (variable) | | |
| $r_{13} =$ | $146.837$ | | |
| | $d_{13} = 3.80$ | $n_8 = 1.67003$ | $\nu_8 = 47.25$ |
| $r_{14} =$ | $-80.269$ | | |
| | $d_{14} = 0.10$ | | |
| $r_{15} =$ | $34.080$ | | |
| | $d_{15} = 7.60$ | $n_9 = 1.48749$ | $\nu_9 = 70.15$ |
| $r_{16} =$ | $-60.335$ | | |
| | $d_{16} = 1.70$ | $n_{10} = 1.71736$ | $\nu_{10} = 29.51$ |
| $r_{17} =$ | $70.612$ | | |
| | $d_{17} = D_3$ (variable) | | |
| $r_{18} =$ | $37.699$ | | |
| | $d_{18} = 5.0$ | $n_{11} = 1.48749$ | $\nu_{11} = 70.15$ |
| $r_{19} =$ | $107.992$ | | |
| | $d_{19} = 28.76$ | | |
| $r_{20} =$ | $72.285$ | | |
| | $d_{20} = 5.00$ | $n_{12} = 1.53172$ | $\nu_{12} = 48.90$ |
| $r_{21} =$ | $-63.118$ | | |
| | $d_{21} = 3.00$ | | |
| $r_{22} =$ | $-26.315$ | | |
| | $d_{22} = 1.50$ | $n_{13} = 1.77250$ | $\nu_{13} = 49.66$ |
| $r_{23} =$ | $-112.160$ | | |

| | f | $D_1$ | $D_2$ | $D_3$ |
|---|---|---|---|---|
| wide position | 51.75 | 2.733 | 35.896 | 13.443 |
| standard position | 100.00 | 24.335 | 20.406 | 7.299 |
| teleposition | 241.25 | 50.233 | 0.535 | 5.002 | overall length of the lens system = 180.64 (W)~225.64 (T)
$|f_2/f_T| = 0.13$, $f_4/f_T = 0.71$ where, reference symbols $r_1$ through $r_2$ respectively represent radii of curvature of respective lenses, reference symbols $d_1$ through $d_{22}$ respectively represent thicknesses of respective lenses and airspaces between respective lenses, reference symbols $n_1$ through $n_{13}$ respectively represent refractive indices of respective lenses, and reference symbols $\nu_1$ through $\nu_{13}$ respectively represent Abbe's numbers of respective lenses.

* * * * *